United States Patent
DeTar et al.

(10) Patent No.: US 6,265,360 B1
(45) Date of Patent: Jul. 24, 2001

(54) COMPOSITIONS CONTAINING WAX MODIFIERS

(75) Inventors: Marvin B. DeTar, Wickliffe; Richard M. Lange, Euclid; John S. Manka, Chardon, all of OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 09/439,789

(22) Filed: Nov. 12, 1999

(51) Int. Cl.[7] ............................... C10L 1/18; C10L 1/24; C10L 1/26

(52) U.S. Cl. .................. 508/397; 508/314; 508/358; 508/370; 508/374; 508/382; 508/385; 508/435

(58) Field of Search ..................... 44/397, 314, 358, 44/370, 374, 382, 385, 435

(56) References Cited

U.S. PATENT DOCUMENTS

| | | | |
|---|---|---|---|
| 5,145,941 | 9/1992 | Munday et al. | 528/287 |
| 5,225,481 | 7/1993 | Gastinger et al. | 525/63 |
| 5,296,573 | 3/1994 | Esselborn et al. | 526/320 |
| 5,633,325 | 5/1997 | Esselborn et al. | 525/326.2 |
| 5,707,943 | 1/1998 | Covitch | 508/466 |
| 5,744,523 | 4/1998 | Barkowsky et al. | 523/523 |

FOREIGN PATENT DOCUMENTS 98 33846  *  8/1998  (WO) .

* cited by examiner

Primary Examiner—Margaret Medley
Assistant Examiner—Cephia D. Toomer
(74) Attorney, Agent, or Firm—Jeffrey F. Munson; Michael F. Esposito; David M. Shold

(57) ABSTRACT

The present invention relates to a wax-containing liquid hydrocarbon fuel composition comprising (a) at least one wax-containing liquid hydrocarbon; and b) a transesterified acrylate polymer obtained by transesterifying a starting acrylate polymer with at least one higher alcohol, the transesterified acrylate polymer being present in an amount sufficient to modify the cold flow properties of the wax containing liquid hydrocarbon fuel.

7 Claims, No Drawings

COMPOSITIONS CONTAINING WAX MODIFIERS

BACKGROUND OF THE INVENTION

The present invention relates to compounds useful for lowering the pour point of wax-containing liquid hydrocarbons, and the resulting compositions. In particular, the present invention is related to novel liquid hydrocarbon fuel compositions having improved properties.

Various types of wax containing distillate fuel oils such as diesel fuels, various oils of lubricating viscosity, automatic transmission fluids, hydraulic oil, home heating oils, and crude oils and fractions thereof require the use of pour point depressant additives in order to allow them to flow freely at lower temperatures. Often kerosene is included in such oils as a solvent for the wax, particularly that present in distillate fuel oils. However, increased demand for kerosene for use in jet fuel has led refiners to separate and recover kerosene thereby decreasing the amount of kerosene present in distillate fuel oils. This, in turn, has required the addition of a wax crystal modifier that would make up for the lack of kerosene. Moreover, the requirement for a pour point depressant additive in crude oils can be even more important since the addition of kerosene is not considered to be economically desirable. The present invention provides such advantages.

U.S. Pat. No. 5,707,943 to Covitch and assigned to the assignee of the present application teaches mixtures of esterified carboxy containing inter-polymers useful as pour point depressants in lubrication compositions.

U.S. Pat. No. 5,744,523, Barkowsky et al., Apr. 28, 1998, discloses that polyacrylate esters having an average molecular weight of 1500 to 20,000 may be manufactured by the transesterification of alkyl polyacrylates containing 1 to 4 carbon atoms in the alkyl group by free radical polymerization and, with a) saturated or unsaturated aliphatic alcohols with 12 to 22 carbon atoms and
b) optionally, additionally with dialkylaminoalkanols of the general formula HO—R$^1$—NR R$^2$R$^3$, wherein R$^1$ is a divalent alkylene groups with 2 to 4 carbon atoms and R$^2$ and R$^3$ are the same or different and represent alkyl groups with 1 to 4 carbon atoms, the molar ratio of the aliphatic alcohols a) to the dialkylaminoalcohols b) being 1:0 and 1:1.5, and the components a) and b) being used in such amounts, that 25 to 70% of the ester groups are transesterified. These materials are used as dispersants for finely divided solids, particularly for fillers and pigments, in organic media.

U.S. Pat. No. 5,633,325 (Esselborn et al., May 27, 1997); U.S. Pat. No. 5,583,184 (Esselborn et al., Dec. 10, 1996) and U.S. Pat. No. 5,571,872 (Esselborn et al., Nov. 5, 1996) disclose polymethacrylate esters, the ester groups of which in the α and optionally in the ω position differ from the ester groups in the chain. These patents also relate to a method for the synthesis of these compounds by transesterification under selected method conditions.

U.S. Pat. No. 5,296,573, Esselborn et al., Mar. 22, 1994, discloses polyacrylate esters with long-chain alkoxylated hydrocarbonoxy groups which can be obtained by the transesterification of polyacrylate esters with polyoxyalkylene monools, wherein the polyacrylate esters, up to 50% of which can be replaced by the corresponding methacrylate esters, have been obtained by free radical polymerization and wherein the polyoxyalkylene monools have the average formula $$R^1O(C_nH_{2n}O—)_xH$$

wherein
R$^1$ is an alkyl alkenyl or alkylphenyl group,
n has an absolute value of 2,3, or 4 and average value of 2.0 to 2.5 and
x is 10 to 200.

The compounds can be used as emulsifiers, solubilizers and for thickening aqueous solutions containing anionic surfactants, particularly in cosmetics for personal grooming, and are distinguished by the content of low molecular weight components, which is smaller than that of the products obtained by copolymerization.

U.S. Pat. No. 5,225,481 (Gastinger et al., Jul. 6, 1993) and U.S. Pat. No. 5,021,506 (Gastinger et al., Jun. 4, 1991) disclose a stable, low viscosity polymer polyol composition comprising a continuous phase, a disperse phase within the continuous phase, and a dispersant for enhancing the stability of the resultant polymer polyol. In one embodiment, the dispersant is formed by polymerizing at least one acrylate monomer in a polyether polyol to form a single phase homogeneous liquid intermediate reaction product which is transesterified to form a polyol polyacrylate dispersant.

U.S. Pat. No. 5,145,914, Esselborn et al., Sep. 8, 1992, discloses polyacrylate esters with ammonium salt groups obtained by the transesterification of alkyl polyacrylates produced by free radical polymerization wherein the alkyl groups of the acrylate esters have 1 to 8 carbon atoms, up to 50% of the acrylate esters can be replaced by the corresponding methacrylate esters and the transesterification is carried out with a) compounds of the formula

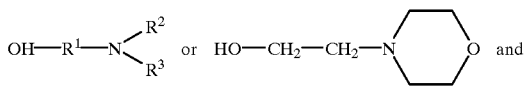

b) saturated or unsaturated aliphatic alcohols having 8 to 22 carbon atoms or alkoxylated alkylphenols having 9 to 27 carbon atoms in the alkylphenol group, wherein the molar ratio of component a) to component b) is 1:9 to 9:1, in such amount that 5 to 70% of the ester groups are transesterified and subsequently, the transesterified product is transformed into a salt. The new polyacylate esters with ammonium salt groups are distinguished by containing a lesser amount of low molecular weight compounds than products obtained through copolymerization and can be used as cationic surfactants and particularly, as active ingredients of metal adjuvents.

SUMMARY OF THE INVENTION

It is the primary object of the present invention to provide a novel wax containing hydrocarbon fuel composition having an improved pour point modifier.

It is another object of the present invention to provide a novel wax containing hydrocarbon fuel composition having an improved pour point modifier and at least one corrosion inhibitor.

It is a further object of the present invention to provide a novel wax containing hydrocarbon fuel composition having an improved pour point modifier and at least one demulsifier.

It is still another object of the present invention to provide a novel process for modifying the cold flow properties of a wax containing hydrocarbon fuel composition.

Additional objects and advantages of the present invention will be set forth in part in the description which follows and in part will be obvious from the description or may be learned by the practice of the invention. The objects and advantages of the invention may be realized and attained by means of the instrumentalities and combinations particularly pointed out in the appended claims.

To achieve the foregoing objects and in accordance with the purpose of the invention as embodied and broadly described herein, the fuel composition of the present invention comprises (A) at least one wax containing liquid hydrocarbon and (B) at least one transesterified acrylate polymer produced by transesterifying an acrylate polymer with at least one higher alcohol.

In another aspect of the present invention, the composition further comprises at least one corrosion inhibitor.

In still another aspect of the present invention, the composition further comprises at least one demulsifier.

In a still further aspect of the present invention, a process for modifying the cold flow properties of a wax containing fuel compositions comprises adding to a wax containing liquid hydrocarbon fuel at least one transesterified acrylate polymer produced by transesterifying an acrylate-polymer with at least one higher alcohol in an amount sufficient to modify the cold flow properties of the wax containing fuel.

DETAILED DESCRIPTION OF THE INVENTION

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

(1) hydrocarbyl substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

(2) substituted hydrocarbon substituents, that is, substituents containing non-hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy);

(3) hetero substituents, that is, substituents which, while having a predominantly hydrocarbon character, in the context of this invention, contain atoms other than carbon in a ring or chain otherwise composed of carbon atoms. Heteroatoms include sulfur, oxygen, nitrogen, and hetero substituents encompass substantially hydrocarbon chains containing heteroatoms, as well as cyclic substituents such as pyridyl, furyl, thienyl and imidazolyl groups. In general, no more than two, preferably no more than one, non-hydrocarbon substituent will be present for every ten carbon atoms in the hydrocarbyl group; typically, there will be no non-hydrocarbon substituents in the hydrocarbyl group.

The term "hydrocarbylene group" refers to a divalent hydrocarbyl group.

The Wax-containing Liquid Hydrocarbon (a)

The first component of the present composition comprises at least one wax-containing liquid hydrocarbon. The wax-containing liquid hydrocarbons of this invention include petroleum oils, such as crude oils, fractions of crude oil, such as naphtha, kerosene, jet fuel, diesel fuel, residual oil, vacuum gas oil, or vacuum residual oils (Bunker C crude oils), and other feed stocks which are heavy in nature, such as atmospheric pipestill residuum, catalytic cracker residuum, and vacuum distillation residuum. Also included are naturally sourced and partially refined oils, including partially processed petroleum derived oils. Also included are alkane processes streams such as those wherein ethylene and propylene are obtained. Also included are olefinic or naphthenic process streams, aromatic hydrocarbons and their derivatives and ethylene glycol.

In one embodiment of the present invention, component (a) has an initial (that is, unmodified, or prior to treatment with the cold flow modifier/pour point depressant) pour point of at least −40° C. (−40° F.), preferably at least 0° C. (32° F.) or more preferably 24° C. (75° F.), although they also exhibit some advantage in certain oils which fall outside of these limits. The use of the present materials is particularly valuable in those crude oils which are difficult to treat by other means. For example, they are particularly useful in oils (crude oils and oil fractions such as those described above) which have a wax content of greater than 20%, preferably greater than 40%, by weight as measured by UOP-46-85 (procedure from UOP, Inc., "Paraffin Wax Content of Petroleum Oils and Asphalts." It should be understood that wax-containing materials are sometimes also referred to as paraffin-containing materials, paraffin being an approximate equivalent for wax, and in particular, for petroleum waxes. The present invention is not particularly limited to any specific type of wax which may cause the pour point phenomenon in a given liquid. Thus paraffin waxes, microcrystalline waxes, and other waxes are encompassed. It is recognized that in many important materials, such as petroleum oils, paraffin wax may be particularly important.

The cold-flow modifier/pour point depressant materials are further useful in oils with a large high-boiling fraction, that is, in which the fraction boiling between 271° C. (520° F.) and 538° C. (1000° F.) (i.e., about $C_{15}$ and above) comprises at least 25%, preferably at least 30%, more preferably at least 35% of the oil (exclusive of any fraction of 7 or fewer carbon atoms). Among high boiling oils, they are more particularly useful if greater than 10%, preferably greater than 20%, more preferably greater than 30%, of the high boiling (271–538° C.) fraction boils between 399° C. (750° F.) and 538° C. (1000° F.) (i.e., about $C_{25}$ and above), as measured by ASTM D 5307-92. Preferably this highest boiling (399–538° C.) fraction will comprise at least 10% of the total oil (exclusive of any fraction of 7 or fewer carbon atoms). Preferably the analysis is performed on stock tank crude which is degassed and contains little or no fraction of $C_4$ or below. They are further useful in materials which have an API gravity of greater than 20° (ASTM D-287-82).

The present pour point depressant material are, in many cases, useful for treating oils (e.g., crude oils and fractions thereof) which have a $N_w$ of greater than 18, preferably greater than 20, and more preferably greater than 22. Here $N_w$ is the weight average number of carbon atoms of the molecules of the oil, defined by $$N_w = \frac{\sum B_n * n^2}{\sum B_n * n}$$

where $B_n$, represents the weight percent of the crude boiling fraction of the oil containing the alkane $C_nH_{2n+2}$ and n is the carbon number of the corresponding paraffin. These boiling fraction values are determined by ASTM procedure D5307-92. Most preferably the suitable oils will have the above defined value of $N_w$, as well as one or more of the above-defined characteristics such as a pour point above 4° C. and/or a wax content of greater than 5% (UOP-41-85 procedure).

The Transesterified Acrylate Polymer (b)

The second component of the present composition comprises a transesterified acrylate polymer obtained by transesterifying an acrylate polymer with at least one alcohol.

The transesterified acrylate polymer as well as the starting acrylate polymer can be a homopolymer of an acrylate monomer or a copolymer comprising a polymerized acrylate monomer. In addition to the polymerized acrylate monomer, the copolymer comprises at least one additional polymerized monomer selected from the group consisting of vinyl aromatic monomers, acrylamides, methacrylates, fumarates, maleates and itaconates. Thus, for example, in one embodiment of this aspect of the present invention, the transesterified or starting acrylate polymer is a copolymer of an acrylate and a methacrylate monomer.

The starting polyacrylate or methacrylate is typically a hydrocarbyl acrylate polymer. In this embodiment of the present invention, the hydrocarbyl group of the hydrocarbyl acrylate polymer contains 1 to 10 carbon atoms, and in another embodiment of this aspect of the present invention 1 to 4 carbon atoms. These alkyl groups are selected primarily with respect to the boiling point of the corresponding alcohols that are removed from the reaction mixture in the course of the transesterification. Generally, as the number of carbon atoms increases, the removal of the alcohols creates greater difficulties.

In a further embodiment of the present invention, the number average molecular weight ($M_n$) of the transesterified acrylate polymer ranges from about 1200 to about 200,000. In another embodiment of this aspect of the present invention $M_n$ ranges from about 5000 to about 100,000, and in a still further aspect $M_n$, ranges from about 10,000 to about 50,000.

The alcohol used for transesterifying of the starting acrylate polymers includes monohydric alcohols represented by the formula ROH, wherein R is a hydrocarbyl group of about 10 to about 30 carbon atoms. In another embodiment of the present invention R may range from about 12 to about 25 carbon atoms. In still another embodiment of the present invention R may range from about 16 to about 24 carbon atoms.

In still another aspect of the present invention, the alcohol, ROH, may be either a linear or branched saturated aliphatic or unsaturated aliphatic alcohol. Suitable examples of such alcohols of this invention include without limitation 1-decanol, 1-dodecanol (cetyl alcohol), lauryl alcohol, oleyl alcohol, 1-hexadecanol, 1-octadecanol (stearyl alcohol), eicosyl alcohol and behenyl alcohol. Higher synthetic monohydric alcohols of the type formed by the Oxo process (e.g., hexadecanol and octadecanol), by the aldol condensation (e.g. ethylhexanol ), or by organoalumninum-catalyzed oligomerization of alpha-olefins (especially ethylene), followed by oxidation, are also useful. Additionally, the partially branched primary alcohol mixtures may be manufactured using the "SHOP" process from mixed olefins, and marketed by Shell Chemical Company as Neodol alcohols, are also useful.

In a further aspect of the present invention, the alcohol is a highly branched Guerbet alcohol derived from a Guerbet condensation reaction. The Guerbet reaction and Guerbet alcohols have been discussed in U.S. Pat. No. 5,094,667, herein incorporated by reference. A Guerbet reaction may involve condensing two small alcohols into a larger branched alcohol, wherein the branched point occurs at the "beta carbon". In this case, the overall Guerbet reaction can be represented by the following equation:

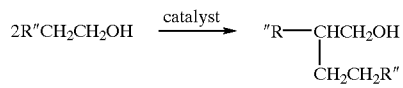

wherein R" is a hydrocarbyl group. The product of this reaction is an alcohol with twice the molecular weight of the reactant alcohol minus a mole of water. Many catalysts have been described as being effective for preparing Guerbet alcohols. These include nickel, lead salts (U.S. Pat. No. 3,119,880), oxides of copper, lead, zinc, chromium, molybdenum, tungsten, and manganese (U.S. Pat. No. 3,558,716); palladium compounds and silver compounds (U.S. Pat. No. 3,864,407). Guerbet alcohols have unusual properties, that may be partly attributable to their high molecular weight, high level of unsaturation, and to the so called "beta branch point".

Although both primary and secondary alcohols can be used for the transesterification reaction, primary alcohols are preferred. Most preferably, the alcohols are primary alcohols having a linear hydrocarbyl structure.

The transesterification reaction may be carried out in the presence of known transesterification catalysts. These include both acid and base catalysts.

The acid catalysts include mineral acids, sulfonic acids, fluoroacids (such as trifluoroacetic acid) as well as mixtures of these. The mineral acids include hydrochloric, sulfuric and phosphoric acids. The sulfonic acid catalysts are represented by the formula $RSO_3H$ where R is hydrocarbyl group of 1 to about 25 carbon atoms. Some examples of these sulfonic acids are methanesulfonic and para-toluenesulfonic acids. Also included are solid acids such as Nafion resins, Amberlyst resins, zeolites, molecular sieves and acidified clay. Lewis acid catalysts such as isopropyl and butyl titanates are also useful.

The base cataylsts include alkali metal oxides, hydroxides or alkoxides, particularly those of potassium or sodium; oxides, alkyls, carboxylates, halides and alkoxides of transition metals such as tin, zinc, zirconium, titanium, aluminum and manganese.

The transesterification can be carried out at a temperature of about 70° C. to about 180° C., and in one embodiment about 110° C. to about 180° C. The reaction can be conducted in the presence of high boiling aromatic or paraffinnic solvents.

The transesterification may be carried out to completion (i.e. quantitative conversion) or to a partial extent. In one aspect of the present invention, the starting polyacrylates and/or polymethacrylates are transesterified to a level of at least 30%, in another embodiment of the present invention at least 50% and in a further aspect of the present invention at least 70%.

The transesterified materials (i.e. component (b)) should be present in an amount sufficient to modify (improve) the cold-flow properties (such as cloud point and pour point) of the wax-containing liquid hydrocarbon. In one embodiment of the present invention, component (b) is present at a level of at least 25 parts per million (ppm) by weight based on the total weight of the wax containing liquid composition. In another aspect of the present invention, component (b) is present at a level of 25 to 1000 ppm, in a further aspect of the present invention component (b) may range from 25 to 500 ppm, and in a still further aspect component (b) may range from 500 to 1000 ppm by weight based on the total weight of the wax containing liquid composition.

Other Optional Components

The compositions of the present invention may contain certain other optional components such as rust or corrosion inhibitors, demulsifiers, water and water soluble inorganic salts, such as sodium chloride.

Typical materials useful as rust or corrosion inhibitors include barium and calcium sulfonates, fatty amines, sorbitan esters (such as sorbitan monooleate), magnesium oleate, lead naphthenate, phosphoric acid esters, alkenyl succinic acids, barium and calcium alkyl phenol sulfides, and imidazoline and oxazoline compounds. The fatty amines and the imidazoline and oxazoline compounds are the preferred corrosion inhibitors of this invention.

In one embodiment, the fatty amine is an ethoxylated tertiary amine represented by the formula

(Op-1)

wherein in formula (Op-1), R is hydrocarbyl group of 12 to 18 carbon atoms, x and y are integers of at least one, and the sum of x and y ranges from 2 to 15, and in one embodiment from 5 to 10. A particularly preferred group of these amines are available from the Akzo Nobel Chemicals., Chicago, Ill., under the name "Ethomeen™". Specific examples of such products include "Ethomeen C/15", a ethylene oxide condensate of a cocoamine containing about 5 moles of ethylene oxide; "Ethomeen C/20" and "C/25" which also are ethylene oxide condensation products from cocoamine containing about 10 and 15 moles of ethylene oxide respectively; "Ethomeen O/12", a ethylene oxide condensation product of oleylamine containing about 2 moles of ethylene oxide per mole of amine. "Ethomeen S/15" and "S/20" which are ethylene oxide condensation products with soy amine containing about 5 and 10 moles of ethylene oxide per mole of amine respectively; and "Ethomeen T/12, T/15" and "T/25" which are ethylene oxide condensation products of tallowamine containing about 2, 5 and 15 moles of ethylene oxide per mole of amine respectively.

In another embodiment of the present invention the feel composition may contain a corrosion inhibitor. For example, the corrosion inhibitor may be an ethoxylated diamine obtained by reaction of N-alkyl trimethylene diamines with ethylene oxide and may be represented by the structure

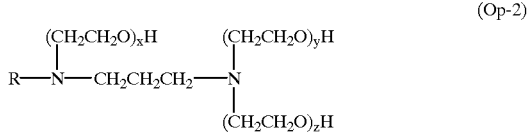

(Op-2)

wherein in formula (Op-2), R is a hydrocarbyl group of 12 to 18 carbon atoms; x, y, and z are each integers of at least one, and the sum of x, y, and z is 3, 10, or 15. They are available the Akzo Nobel Chemicals., Chicago, Ill., under the name "Ethoduomeen". Specific examples of "Ethoduomeen" include "Ethoduomeen T/13", "Ethoduomeen T/20", and "Ethoduomeen T/25", containing 3, 10, and 15 moles of ethylene oxide respectively.

In still another embodiment of the present invention, the corrosion inhibitor is an organo-borate compound. Examples of suitable organo-borate compounds are disclosed in U.S. Pat. No. 4,622,158 herein incorporated by reference. In this embodiment, the organo-borate compound is represented by the formula

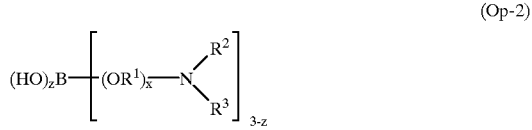

(Op-2)

wherein in formula (Op-2), $R^1$ is a hydrocarbylene group; $R^2$ is a hydrocarbyl group or a group of the formula $—(R^4O)_yH$; $R^3$ and $R^5$ are hydrocarbyl groups; $R^4$ is a hydrocarbylene group; x is an integer of at least 1; y is an integer of at least 1, and the sum of x and y range on the average from 2 to 75, and in one embodiment from 15 to 20; and z is 0, 1, or 2.

In a further embodiment of the present invention, the corrosion inhibitor is an organic quaternary ammonium salt having a fatty alkyl group. In this embodiment, the ammonium salt is represented by the formula

(Op-3)

wherein in formula (Op-3), $R_1$ is a hydrocarbyl group of 8 to 28 carbon atoms, and $R^2$ is hydrogen or methyl. In another embodiment of this aspect of the present invention, the ammonium salt is a bis-quaternary ammonium salt represented by the formula

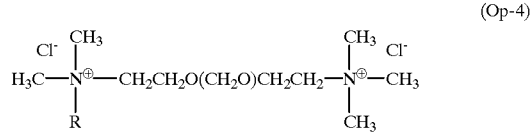

(Op-4)

where $R'=C_{12}–C_{18}$ hydrocarbyl, a=0 or 1

The quaternary organic ammonium salts, such as those disclosed above may also be useful as bactericides in addition to their being useful as corrosion inhibitors. They are commonly used in drilling operations for crude oils.

The demulsifiers comprise nitrogen containing compounds such as oxazoline and imidazoline compounds and fatty amines as described hereinabove and Mannich compounds.

The Mannich compounds are the reaction products of alkylphenols and aldehydes (especially formaldehyde) and amines (especially amine condensates and polyalkylenepolyamines). The materials described in the following U.S. Patents are illustrative: U.S. Pat. Nos. 3,036,003; 3,236,770; 3,414,347; 3,448,047; 3,461,172; 3,539,633; 3,586,629; 3,591,598; 3,634,515; 3,725,480; 3,726,882; and 3,980,569 herein incorporated by reference.

EXAMPLES

Example 1

Preparation of Poly (Methyl Acrylate) (Not of Invention)

A twelve-liter, four-necked flask is equipped with stirrer, thermowell, notrogen sparge tube under a first pressure-equalized addition funnel, a second pressure equalized addition funnel with a nitrogen purge and a Friedrich's condenser with a nitrogen/oil bubbler outlet on a Claisen head adapter. The first addition funnel is charged with a portion of methyl acrylate monomer (956 grams; 11.1 moles). The second addition funnel is charged with a portion of (885 g) of a 0.66% solution of benzoyl peroxide initiator (0.0169 mole) in Aromatic 150 solvent. (The 0.66% solution of benzoyl peroxide is made by combining 34.9 grams of 70% benzoyl peroxide with 5239 grains of Aromatic 150 solvent). The system is purged with nitrogen (flow rate 0.5 standard $ft^3/hr$; $3.93 \times 10^{-6}$ $m^3/sec$) for thirty minutes. The flask is then charged with 575 mL (6.38 moles) of methyl acrylate and 1000 mL of the 0.66% solution of benzoylperoxide in Aromatic 150 solvent. The addition funnels are recharged as necessary for the remainder of the processing and maintained under a blanket of nitrogen. The reaction flask is slowly heated to 70° C., where an exotherm takes place, raising the temperature to 150° C. and vigorous refluxing takes place. When the exotherm subsides and the temperature returns to 107° C., the remaining portions of both the methyl acrylate monomer (~1768 grams) and the initiator solution (~3489 grams of the 0.66% benzoyl peroxide solution) in the addition funnels are fed simultaneously into the reaction flask over a four hour period, while maintaining the temperature at 107° C. Forty five minutes after complete addition, a slurry of 3.45 grams of benzoyl peroxide in Aromatic 150 solvent (11.5 mL) is charged to the reaction flask. (A total of 3274 grams of methyl acrylate monomer (38.0 moles), 5250 grams of Aromatic 150 solvent and 38.35 grams of benzoyl peroxide initiator (70%) (0.11 mole) are used for this reaction). A slight exotherm is observed (the temperature rises to 112° C.). The temperature is maintained at 107° C. for an additional 30 minutes. The reactor is set up for downward distillation and the temperature is ramped to 125° C., then maintained at 120–125° C. for two hours with nitrogen sparging at 2.0 standard $ft^3/hr$ ($1.57 \times 10^{-5}$ $m^3/sec$) to remove volatiles. A colorless two phase distillate (42 grams in the upper phase, 1 gram in lower phase) is obtained. (Note: some methyl acrylate may polymerize in the distillation receiver. Use of an inhibitor to prevent polymerization may be helpful.) The residue of hot polymer solution is poured out and collected as product, which, upon cooling, separates into two phases. Both phases constitute the product. The product has a saponification number of 232, and a number average molecular weight (Mw) of 8169 and a weight average molecular weight (Mw) of 12,149, based on gel permeation chromatography using a polystyrene standard. The product can be useful as a wax deposition inhibitor in crude oil pipelines.

Example 2

Transesterification of Poly (Methyl Acrylate) with Octadecanol

A twelve-liter, four necked flask is equipped with stirrer, thermowell, nitrogen sparge tube, Dean-Stark trap, and a Friedrich's condenser with a nitrogen/oil bubbler outlet. The flask is charged with 3140 grams (13.9 equivalents based on formula weight of methyl acrylate) of a warm homogeneous solution of poly (methyl acrylate) (38% in Aromatic 150 solvent) (as prepared in Example 1 above), and 2693 grams (9.87 moles) of 1-octadecanol. Nitrogen is sparged at the rate of 0.4 standard $ft^3/hr$ ($3.14 \times 10^{-6}$ $m^3/sec$). The reaction mixture is heated to 90° C. with stirring. Thereafter, 39 grams (0.285 mole) of methanesulfonic acid (70% in water) is charged to the reaction flask. The flask is heated to 160° C. with removal of distillate (methanol). (Methanol removal begins at about 135° C. It distils off rapidly at 160° C. A total of 394 mL of distillate is removed). The transesterification reaction is monitored by infrared spectroscopy (the —OH band at 3550 $cm^{-1}$ becomes smaller than the 2672 $cm^{-1}$ band that is used as the internal standard for comparison of spectra). The reaction is complete after about 12 hours. The residue is collected as the product. The product has an acid number of 1.3, and a nonvolatile content of 64% by weight; and is found by NMR spectroscopy to contain about 64% octadecyl ester and about 36% methyl ester functionalities. The product can be useful as a wax deposition inhibitor in crude oil pipelines.

Example 3

Transesterification of Poly (Methyl Acrylate) with Alfol 20+ Alcohols

A twelve-liter, four necked flask is equipped with stirrer, thermowell, nitrogen sparge tube, Dean-Stark trap, and a Friedrich's condenser with a nitrogen/oil bubbler outlet. The flask is charged with 2682 grams (11.9 equivalents based on formula weight of methyl acrylate) of a slurry of poly (methyl acrylate) in 38% in Aromatic 150 solvent (as prepared in Example 1 above), and 2583 grams (8.33 moles) of Alfol 20+ alcohols (A mixture of $C_{18-26}$ alcohols available from Condea/Vista). Nitrogen is sparged at the rate of 0.5 standard $ft^3/hr$ ($3.93 \times 10^{-6}$ $m^3/sec$). The reaction mixture is heated to 90° C. with stirring. Thereafter, 32.6 grams (0.238 mole) of methanesulfonic acid (70% in water) is charged to the reaction flask. The flask is heated to 160° C. with removal of distillate (methanol). (Methanol removal begins at about 135° C. It distils off rapidly at 160° C. A total of 283 mL of distillate is removed). The transesterification reaction is monitored by infrared spectroscopy (the —OH band at 3550 $cm^{-1}$ becomes smaller than the 2672 $cm^{-1}$ band that is used as the internal standard for comparison of spectra). The reaction is complete after about 11 hours. The residue is collected as the product. The product has an acid number of 1.3, a saponification number of 126, and a nonvolatile content of 67% by weight; and is found by NMR Spectroscopy to contain about 50% high alkyl ester and about 36% methyl ester functionalities. The product can be useful as a wax deposition inhibitor in crude oil pipelines.

Example 4

Transesterification of Poly (Methyl Acrylate) with $C_{18-22}$ Alcohols

A twelve-liter, four necked flask is equipped with stirrer, thermowell, nitrogen sparge tube, Dean-Stark trap, and a Friedrich's condenser with a nitrogen/oil bubbler outlet. The flask is charged with 3154 grams (13.9 equivalents based on formula weight of methyl acrylate) of a slurry of poly (methyl acrylate) in 38% in Aromatic 150 solvent (as prepared in Example 1 above), and 3081 grams (9.75 moles) of Nafol 1822B alcohols (a mixture of $C_{18-22}$ alcohols containing about 45% $C_{18}$, 10% $C_{20}$ and 45% $C_{22}$ alcohols and available from Condea/Vista). Nitrogen is sparged at the rate of 0.5 standard $ft^3/hr$ ($3.93 \times 10^{-6}$ $m^3/sec$). The reaction mixture is heated to 90° C. with stirring. Thereafter, 38.2 grams (0.279 mole) of methanesulfonic acid (70% in water) is charged to the reaction flask. The flask is heated to 160° C. with removal of distillate (methanol). (Methanol removal begins at about 135° C. It distils off rapidly at 160° C. A total of 374 mL of distillate is removed). The transesterification reaction is monitored by infrared spectroscopy (the —OH band at 3550 $cm^{-1}$ becomes smaller than the 2672 $cm^{-1}$ band that is used as the internal standard for comparison of spectra). The reaction is complete after about 9 hours. The residue is collected as the product. The product has an acid number of about 1.2, a saponification number of about 120, and a nonvolatile content of 67% by weight; a weight average molecular weight (Mw) of 53,577, a number average molecular weight of 25,503 based on gel permeation chromatography and using polystyrene standards; and is found by NMR spectroscopy to contain about 64% alkyl ester and about 36% methyl ester functionalities. The product can be useful as a wax deposition inhibitor in crude oil pipelines.

Example 5

Transesterification of Poly (Methyl Acrylate) with $C_{12-18}$ and $C_{18-22}$ Alcohols A one-liter, four necked flask is equipped with stirrer, thermowell, nitrogen sparge tube, Dean-Stark trap, and a Friedrich's condenser with a nitrogen/oil bubbler outlet. The flask is charged with 354 grams (1.57 equivalents based on formula weight of methyl acrylate) of a slurry of poly (methyl acrylate) in 38% in Aromatic 150 solvent (as prepared in Example 1 above), 201 grams (0.93 mole) of CL-1218 alcohols (available from Condea/Vista) and 31 grams (0.10 mole) of Nafol 1822 (a mixture of $C_{18-22}$ alcohols containing about 45% $C_{18}$, 10% $C_{20}$ and 45 % $C_{22}$ alcohols and available from Condea/Vista) and 2.77 grams (0.023 mole) of methanesulfonic acid (70% in water). The reaction mixture is heated slowly to 160° C. with good stirring and slow (0.5 standard ft³/hr (3.93×10⁻⁶ m³/sec)) nitrogen sparging, and methanol distillate is removed over a 20-hour period at that temperature. Thereafter, is charged to the reaction flask. The flask is heated to 160° C. with removal of distillate (methanol). (The nitrogen sparge facilitates the removal of methanol from the reaction flask during the transesterification process. Increasing the sparge rate increases the methanol removal rate, but too high a rate tends to additionally remove some of the Aromatic 150 solvent. Methanol removal begins at about 135° C. It distils off rapidly at 160° C. A total of 22.8 mL of methanol distillate (lower phase; may partly contain water) and 21.8 mL (upper phase) of lighter hydrocarbons was captured in the Dean-Stark trap). The transesterification reaction is monitored by infrared spectroscopy (with time, the —OH band at 3550 cm⁻¹ becomes smaller than the 2672 cm⁻¹ band that is used as the internal standard for comparison of spectra). The residue of the reaction flask is cooled to 100° C. and collected as the product. The product is a yellowish moderately viscous liquid; it has an acid number of about 1.3, a nonvolatile content of 60% by weight; a weight average molecular weight (Mw) of about 45,000, a number average molecular weight of about 19,500 based on gel permeation chromatography and using polystyrene standards. The product can be useful as a cloud point depressant for middle distillates as well as a wax deposition inhibitor in crude oil pipelines.

Example 6

Various samples of wax containing liquid hydrocarbon compositions of the present invention were compared with wax containing liquid hydrocarbon without the transesterified acrylate polymer obtained by transesterification of acrylate polymer with at least one alcohol. The pour point for each sample determined using ASTM D5950 (Automatic Tilt Method) and the results forth below in Tables I to III.

TABLE I

Effect of Pour Point Depressants On Sweet Gas Oil*

| Sample # | Composition | Pour Point In ° F. | PPM (V/V) |
|---|---|---|---|
| 1 | Sweet Gas Oil (Baseline w/o depressant) | 70 | |
| 2 | Sweet Gas Oil + $C_{20}$ polyacralate | 60 | 50 ppm active |
| 3 | Sweet Gas Oil + $C_{22}$ polyacrylate | 40 | 50 ppm active |
| 4 | Sweet Gas Oil + $C_{22}$ polyacrylate | 40 | 100 ppm active |
| 5 | Sweet Gas Oil + $C_{22}$ polyacrylate | 35 | 150 ppm active |

*Obtained from Marathon Oil Refinery, Garyville (300-11)

TABLE II

Effect of Pour Point Depressants On Heavy Gas Oil

| Sample # | Composition | Pour Point In ° F. | PPM (V/V) |
|---|---|---|---|
| 6 | Heavy Gas Oil (Baseline w/o Depressant) | 95 | |
| 7 | Heavy Gas Oil + $C_{20}$ polyacrylate | 85 | 100 ppm active |
| 8 | Heavy Gas Oil + $C_{22}$ polyacrylate | 65 | 100 ppm active |
| 9 | Heavy Gas Oil + $C_{22}$ polyacrylate | 50 | 200 ppm active |
| 10 | Heavy Gas Oil + $C_{22}$ polyacrylate | 50 | 400 ppm active |
| 11 | Heavy Gas Oil + $C_{18-22}$ polyacrylate | 80 | 100 ppm active |

*Obtained from Marathon Oil Refinery, Garyville (300-13)

TABLE III

Effect of Pour Point Depressants On Hydrodesulfurized Heavy Vacuum Gas Oil (HHV Gas Oil)

| Sample # | Composition | Pour Point In ° F. | PPM (V/V) |
|---|---|---|---|
| 12 | HHV Gas Oil (Baseline W/O Depressant) | 85 | |
| 13 | HHV Gas Oil + $C_{20}$ polyacrylate | 70 | 100 ppm active |
| 14 | HHV Gas Oil + $C_{22}$ polyacrylate | 65 | 100 ppm active |
| 15 | HHV Gas Oil + $C_{22}$ polyacrylate | 60 | 200 ppm active |
| 16 | HHV Gas Oil + $C_{15-22}$ polyacrylate | 55 | 100 ppm active |
| 17 | HHV Gas Oil + $C_{15-22}$ polyacrylate | 45 | 200 ppm active |

*Obtained from Marathon Oil Refinery, Garyville (300-12)

Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the upper and lower amount, range, and ratio limits set forth herein may be independently combined.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A wax-containing liquid composition comprising at least one wax-containing liquid hydrocarbon, a transesterified acrylate polymer obtained by transesterifying an acrylate polymer with at least one alcohol, and at least one corrosion inhibitor selected from the group consisting of barium sulfonates, calcium sulfonates, sorbitan esters, magnesium oleate, lead naphthenate, phosphoric acid esters, alkenyl succinic acids, barium alkyl phenol sulfides, calcium alkyl phenol sulfides, and organo-borate compounds.

2. A wax-containing liquid composition comprising at least one wax-containing liquid hydrocarbon, a transesterified acrylate polymer obtained by transesterifying an acrylate polymer with at least one alcohol, and a demulsifier selected from Mannich compounds.

3. A wax-containing liquid composition comprising at least one wax-containing liquid hydrocarbon, a transesterified acrylate polymer obtained by transesterifying an acrylate polymer with at least one alcohol, water and at least one inorganic salt.

4. The composition of claim 3 wherein the inorganic salt comprises sodium chloride.

5. The composition of claim 1 wherein the liquid hydrocarbon is a crude oil, residual oil or diesel fuel.

6. The composition of claim 2 wherein the liquid hydrocarbon is a crude oil, residual oil or diesel fuel.

7. The composition of claim 3 wherein the liquid hydrocarbon is a crude oil, residual oil or diesel fuel.

* * * * *